(12) United States Patent
Laskaris et al.

(10) Patent No.: US 11,619,526 B2
(45) Date of Patent: Apr. 4, 2023

(54) FIRE TRUCK PUMP FLOW PREDICTION SYSTEM

(71) Applicant: Hale Products, Inc., Collegeville, PA (US)

(72) Inventors: Michael A. Laskaris, Collegeville, PA (US); David Miller, Collegeville, PA (US)

(73) Assignee: HALE PRODUCTS, INC., Ocala, FL (US)

( * ) Notice: Subject to any disclaimer, the term of this patent is extended or adjusted under 35 U.S.C. 154(b) by 312 days.

(21) Appl. No.: 16/847,030

(22) Filed: Apr. 13, 2020

(65) Prior Publication Data
US 2020/0326215 A1    Oct. 15, 2020

Related U.S. Application Data

(60) Provisional application No. 62/832,422, filed on Apr. 11, 2019.

(51) Int. Cl.
| | |
|---|---|
| *G01F 1/34* | (2006.01) |
| *A62C 31/28* | (2006.01) |
| *G01F 1/10* | (2006.01) |
| *G01F 1/115* | (2006.01) |

(52) U.S. Cl.
CPC .............. *G01F 1/34* (2013.01); *A62C 31/28* (2013.01); *G01F 1/103* (2013.01); *G01F 1/115* (2013.01)

(58) Field of Classification Search
CPC ........... G01F 1/34; A62C 31/00; A62C 37/00; A62C 37/08; F04B 2205/02; F04B 2205/04; F04B 2205/05; F04B 2205/09
See application file for complete search history.

(56) References Cited

U.S. PATENT DOCUMENTS

| | | | |
|---|---|---|---|
| 4,576,197 A | 3/1986 | Kempers | |
| 6,179,553 B1 | 1/2001 | Liegat | |
| 6,241,485 B1 | 6/2001 | Warwick | |
| 6,454,540 B1* | 9/2002 | Terefinko | G05D 11/131 |
| | | | 417/46 |
| 6,663,349 B1 | 12/2003 | Discenzo et al. | |
| 6,954,713 B2 | 10/2005 | Eryurek | |
| 9,399,150 B1* | 7/2016 | Almutairi | G08G 1/205 |
| 10,151,315 B2 | 12/2018 | Gahlot et al. | |
| 2012/0061108 A1* | 3/2012 | Cerrano | A62C 31/02 |
| | | | 169/46 |
| 2019/0345955 A1 | 11/2019 | DeClerck et al. | |

* cited by examiner

*Primary Examiner* — Erika J. Villaluna
(74) *Attorney, Agent, or Firm* — Panitch Schwarze Belisario & Nadel LLP (57) ABSTRACT

A fire truck pump flow prediction system includes a pump, an inlet pipe connected to the pump, a discharge pipe connected to the pump, an intake pressure sensor connected to the inlet pipe, a discharge pressure sensor connected to the discharge pipe, a rotational sensor associated with the pump and a central processor connected to the intake pressure sensor, the discharge pressure sensor and the rotational sensor. The intake pressure sensor is configured to detect fire suppressant inlet pressure and the discharge pressure sensor is configured to detect fire suppressant discharge pressure. The rotational sensor configured to detect a rotational speed of the pump. The central processor configured to determine a flow through the pump and into the discharge pipe based on the inlet pressure, the discharge pressure and the rotational speed.

19 Claims, 4 Drawing Sheets

FIRE TRUCK PUMP FLOW PREDICTION SYSTEM

CROSS-REFERENCE TO RELATED APPLICATIONS

The present application claims the benefit of U.S. Provisional Patent Application No. 62/832,422, filed on Apr. 11, 2019 and titled "Fire Truck Flow Prediction System," the entire contents of which are incorporated herein by reference in its entirety.

BACKGROUND OF THE INVENTION

The delivery of water through hose lines to the burning material at a fire site is a definitive factor in whether the fire will or will not be controlled. The volume of water delivered through the hose lines is typically measured in gallons per minute (GPM). On a fire truck, knowledge of the flow from the fire truck pump is an important metric for a multitude of reasons including but not limited to the following examples.

Flow and total water applied to structures adds weight and can be a significant factor in structural stability or potential collapse of the burning structure.

Certain situations demand a minimum flow. The National Fire Protection Association (See NFPA1403) recommends ninety-five US gallons per minute (95 US GPM) as the minimum flow for interior attack of fire and most departments look to flows in excess of that when moving inside a burning building, both for quick extinguishment and safety.

Fire flow requirements for different size building hazards can be estimated.

In some places where water is scarce, a fire district or water district can charge for water flow used. Fire personnel, therefore, are at times required to maintain a record of the total flow applied to a fire to determine how much payment is required for use of the scarce water.

'Automatic' type fire nozzles at the end of the hose make a similar looking stream across a wide range of flow volumes so inadequate flow may not be easily recognized by visualization of the stream flowing from the automatic type fire nozzle. This stream that has a similar appearance at a wide range of flows from the automatic type fire nozzles may result in undetected low flows that are hazardous to fire personnel and the burning structures, as these low flows do not meet the need for extinguishment of the fire. These similarly appearing flows may also result in undetected high flows that are hazardous to structures that are overloaded by the weight of the water or other fire retardant applied to the structure.

Excessive flows in some cases can be a safety hazard to personnel by generating excessive reaction forces. In addition, undetected excessive flows can be a safety hazard to fire personnel and the structure being extinguished, as described above, as the extinguishing water or suppressant is heavy and may impart an impractically large load on the burning structure, particularly if the structure is compromised by the fire.

If the flow is not known then all the above factors are subject to guesswork, as inadequate flow may impede the ability to extinguish the fire and excessive flow may create excessive reaction forces or place the burning structure in danger of collapse.

Figure 1:
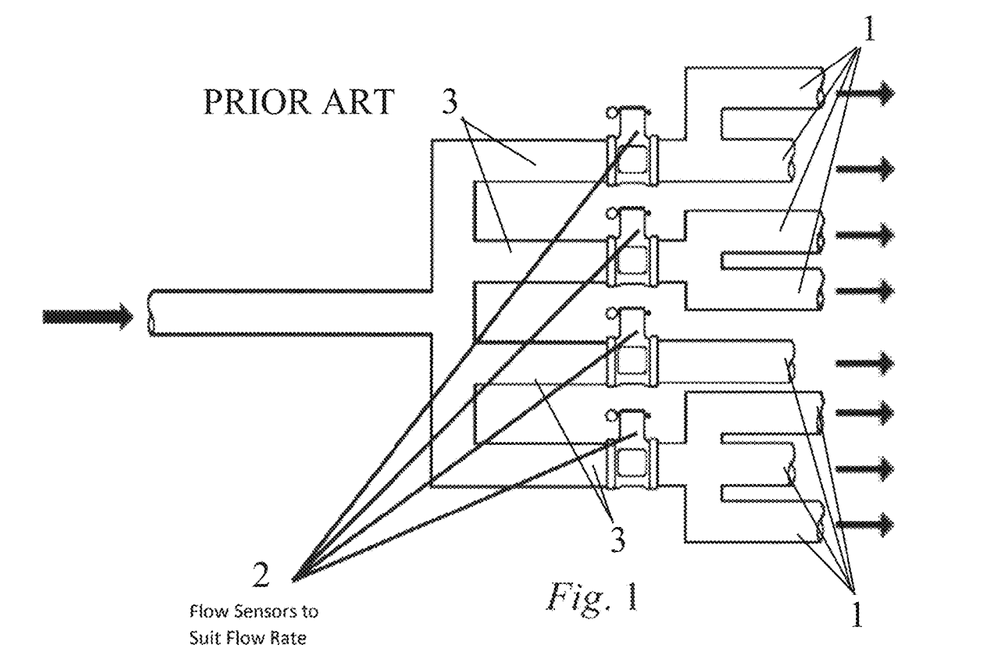
FIG. 1 is a schematic diagram of a manifold of a fire truck discharge manifold flow system with four flowmeters connected to eight discharges of a prior art flow detection system, wherein the flowmeters 2 require relatively long straight sections of pipe 3 and the flowmeters 2 take up significant space in the limited space fire truck.
Figure 2:
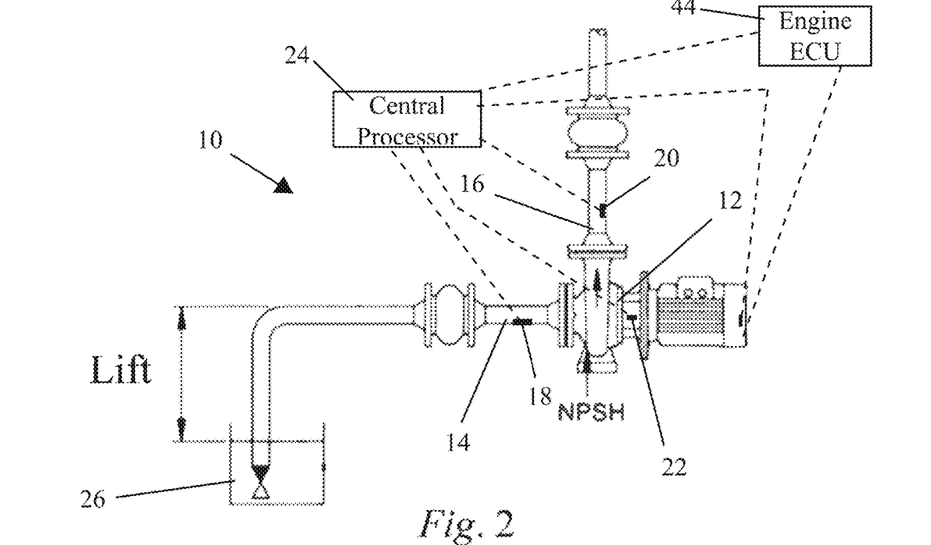
FIG. 2 is a suction lift diagram for a fire truck pump flow prediction system in accordance with a preferred embodiment of the present invention.

Referring to FIG. 1, fire trucks often have ten to twelve (10-12) discharges, wherein the example fire truck of FIG. 1 has eight (8) discharges 1. Flowmeters 2 may be installed to measure flow but they are costly and take up space on the fire equipment, as well as adding additional weight to the equipment. Typically, the flowmeters 2 need to be installed on individual discharges 1 or at input pipes 3 that flow into the discharges 1, so the range of flows used has some accuracy and equipment may have multiple discharges 1 during operation (See, FIG. 1). Certain flowmeters 2 may also require relatively long straight sections of pipe 3 that take up additional space in the space starved fire truck. Alternatively, the fire truck may be designed without flowmeters and flowrates are unknown by users or the users are required to guess or estimate the flowrates and total flow during a fire event, which is undesirable. Both the detection of flow by flowmeters 2 and lack of sensors for detecting flow result in disadvantages for the users, per the above.

It would be desirable to design, develop, implement and deploy a fire truck pump flow prediction system that is able to predict the total flow and volume of flow that is expelled from a fire truck during a fire suppression event. It is desirable that the fire truck pump flow prediction system avoids the complication and space requirements of the typical flowmeters, improves accuracy of the detection of total flow through the fire truck and is able to quickly detect flow through the fire truck quickly during the fire suppression event. The preferred fire truck pump flow prediction system of the present invention addresses the limitations and disadvantages of the prior art flowmeters and fire trucks that do not include systems or instruments for determining flow through the system.

BRIEF SUMMARY OF THE INVENTION

The present invention relates to a system and method for predicting the flow of a fluid through a pump, preferably a centrifugal pump. More particularly, the present invention relates to a system and method for predicting the flow of a fire suppressing fluid through a fire truck pump.

Briefly stated, a preferred embodiment of the present invention is directed to a fire truck pump flow prediction system for predicting the flow of fire suppressant through the fire truck. The fire truck pump flow prediction system includes a pump connected to the fire truck, an inlet pipe connected to the pump configured to provide the first suppressant to the pump, a discharge pipe connected to the pump configured to carry the fire suppressant away from the pump, an intake pressure sensor connected to the inlet pipe, a discharge pressure sensor connected to the discharge pipe, a rotational sensor associated with the pump and a central processor connected to the intake pressure sensor, the discharge pressure sensor and the rotational sensor. The intake pressure sensor configured to detect fire suppressant inlet pressure flowing into the pump. The discharge pressure sensor configured to detect fire suppressant discharge pressure flowing out of the pump. The rotational sensor configured to detect a rotational speed of the pump during operation. The central processor configured to determine a flow through the pump and into the discharge pipe based on the inlet pressure, the discharge pressure and the rotational speed.

Calculating the total flow through the impeller of the pump offers a reduced size pump installation which is important to keep the size and cost of the fire truck at a reasonable level. Further, calculating the flow through the impeller of the pump involves pressure sensing that is inherently more reliable than typical fire industry flow sensors, as flow sensors are often paddlewheels that can provide inaccurate and questionable flow readings during operation.

BRIEF DESCRIPTION OF THE SEVERAL VIEWS OF THE DRAWINGS

The following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. Unless specifically set forth herein, the terms "a", "an" and "the" are not limited to one element but instead should be read as meaning "at least one." The words "right," "left," "lower," and "upper" designate directions in the drawings to which reference is made. The words "inwardly" or "distally" and "outwardly" or "proximally" refer to directions toward and away from, respectively, the geometric center or orientation of the preferred device, system and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 2-5, preferred embodiments of the present invention are directed to a fire truck flow prediction system, generally designated 10, for predicting flow of first suppressant through the fire truck. The fire truck flow prediction system 10 includes a pump 12, an inlet pipe 14 connected to the pump 12 configured to provide the fire suppressant to the pump 12, a discharge pipe 16 connected to the pump 12 configured to carry the first suppressant away from the pump 12, an intake pressure sensor 18 connected to the inlet pipe 14, a discharge pressure sensor 20 connected to the discharge pipe 16, a rotational sensor 22 associated with the pump 12 and a central processor 24 connected to the intake pressure sensor 18, the discharge pressure sensor 20 and the rotational sensor 22. The pump 12 includes an impeller that drives the fire suppressant through the system 10. The intake pressure sensor 18 is configured to detect fire suppressant inlet pressure flowing into the pump 12. The discharge pressure sensor 20 is configured to detect fire suppressant discharge pressure flowing out of the pump 12. The rotational sensor 22 is configured to detect a rotational speed of the pump 12 during operation, preferably the rotational speed of an impeller of the pump 12 that drives the first suppressant into the discharge pipe 16. The central processor 24 is configured to determine a flow through the pump and into the discharge pipe 16 based on the inlet pressure, the discharge pressure and the rotational speed and power consumption by the pump 12 as delivered by the primer mover. The central processor 24 is not limited to a single piece of hardware and may be comprised of a series of processors for distributed signal processing that function as the central processor 24 for collecting and storing the herein described data, making the herein described calculations and presenting results of the calculations and the collected data to the user.

Determining Max Flow

In order to determine the maximum flow through the pump 12, there are two competing equations that must be satisfied and solved simultaneously. As the flow increases the available Net Positive Suction Head (NPSHa) losses will increase (inlet hose friction loss or hydrant system loss will increase), also as flow increases the pump's required Net Positive Suction Head (NPSHr) will decrease. Therefore:

$$NPSHa > NPSHr$$

But at the absolute limit the equation will be considered equal:

$$NPSHa = NPSHr$$

At flows greater than four hundred gallons per minute (400 GPM), the combined equation becomes:

$$z - a_h * \text{gpm}^2 = a_2 * \text{gpm}^2 + a_1 * \text{gpm} + a_0$$

At flows below four hundred gallons per minute (400 GPM) for a typical fire pump, the losses are negligible in standard inlet hoses and while the same theory can be used at lower flows, these lower flows are typically well within the range of fire pumps so that max flow is not a concern. When operating at higher flows, then the maximum flow capability becomes of critical concern.

Combining and setting equal to 0 becomes:

$$0 = (a_2 + a_h) * \text{gpm}^2 + a_1 * \text{gpm} + (a_0 - z) \text{ (Units in ft-hd) \& (U.S. GPM)}$$

The $2^{nd}$ order polynomial can be solved for GPM by using the quadratic equation.

Where:
$a = (a_2 + a_h) \rightarrow (3.51404e{-}006 + a_h)$
$b = a_1 \rightarrow (-0.000526364)$
$c = (a_0 - z) \rightarrow (5.453943627 - z)$ Quadratic equation is:

$$gpm = \frac{-b \pm \sqrt{b^2 - 4ac}}{2a}$$

Or the two equations become:

Max Flow #1($gpm$) =

$$\frac{-(-.000526364) + \sqrt{(-0.000526364)^2 - 4(3.51404e - 006 + a_h)(5.453943627 - z)}}{2(3.51404e - 006 + a_h)}$$

Max Flow #2($gpm$) =

$$\frac{-(-.000526364) - \sqrt{(-0.000526364)^2 - 4(3.51404e - 006 + a_h)(5.453943627 - z)}}{2(3.51404e - 006 + a_h)}$$

The results of the two equations often result in one positive flow and one negative flow. In this case use the value is positive. Only positive flow is a valid result.

Depending on the shape of the actual pump characteristic curve, the two results may both be positive in which case the power consumed by the pump is used to determine which result is the correct calculated flow.

Support Data for Determining above Equation

Flow prediction formula and assumptions used are described herein. One method to determine potential maximum flow through the pump 12 is to compare the Net Positive Suction Head available (NPSHa) to the Net Positive Suction Head required (NPSHr). The standard industry criterion is that in order to prevent a pump from operating in cavitation is that NPSHa MUST be greater than NPSHr or NPSHa>NPSHr Simply NPSHa is the pressure that is available from environmental conditions, inlet components and configuration whereas NPSHr is the minimum pressure that the pump 12 can operate without entering into cavitation. This minimum pressure will vary as the flow varies; i.e. as the flow increases the minimum pressure will increase. Conversely for NPSHa as the flow rate increases NPSHa will decrease (loss in the inlet hose and or hydrant system will increase).

NPSHr

Figure 3:
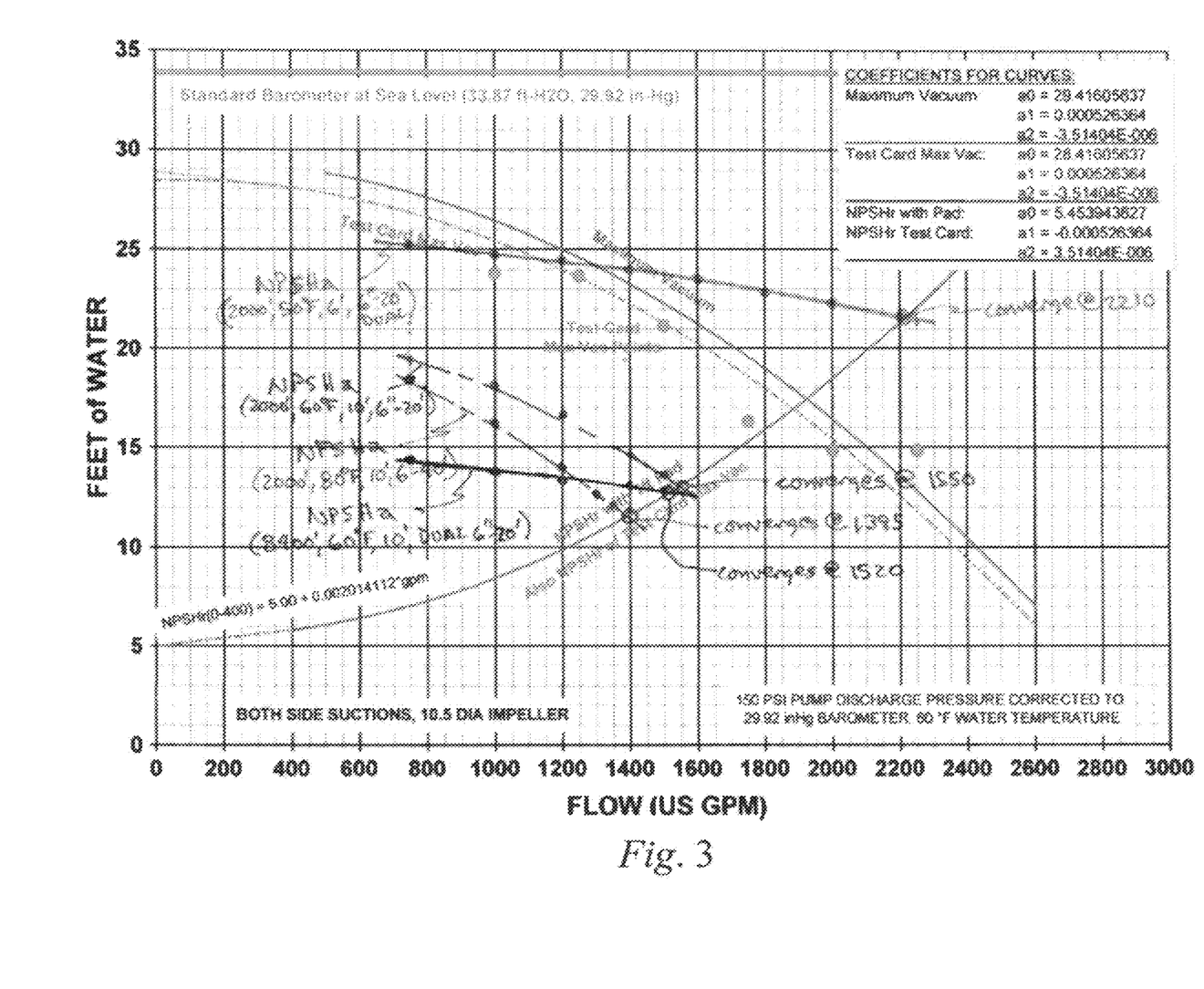
FIG. 3 is a curve chart for a typical centrifugal pump for a fire truck pump flow prediction system in accordance with a preferred embodiment of the present invention.

Referring to FIG. 3, there are shown several curve lines, these include; the maximum vacuum line, test card Max Vac line (Max Vac line less 1') and NPSHr (which includes a 1' pad, this pad helps ensure the pump 12 stays away from or out of cavitation). On the curve are the coefficients for the curve lines equations. The form of the NPSHr curve (from four hundred to two thousand six hundred gallons per minute (400-2600 GPM)) takes the form of a $2^{nd}$ order polynomial equation. From zero to four hundred gallons per minute (0-400 GPM) takes on roughly a linear curve.

NPSHr$_{(0-400)}$=0.002014112*gpm+5.00 (Units in ft-hd)

NPSHr$_{(400-2600)}$=$a_2$*gpm$^2$+$a_1$*gpm+$a_0$ (Units in ft-Hd)

Where:
$a_2$=3.51404e−006
$a_1$=−0.000526364
$a_0$=5.453943627

NPSHa

NPSHa is the available pressure and will be measured at the impeller inlet or in the inlet pipe 14 of the pump 12 and is derived from Absolute Pressure (atmospheric pressure) Vapor Pressure (this is a Δ difference from sixty degrees Fahrenheit (60° F.)−Hose or line loss−Lift or +Positive Head. Units should be consistent and in this case (ft-Hd). Therefore, NPSHa=$P_{atm}$±$P_{vap(\Delta\alpha° F.)}$−Lift+$P_{hydrant}$−LOSS$_{hose}$ (Units in ft-hd)

First consider the case of Draft operation with Lift.

NPSHa=$P_{atm}$±$P_{vap(\Delta 60° F.)}$−Lift−Loss$_{hose}$ (Units in ft-hd)

It can be noted that during a normal pumping operation, for the most part, the atmospheric pressure ($P_{atm}$), water temperature (vapor pressure, $P_{vap}$) and Lift will not significantly change and are not affected by changes in the flow rate. Accordingly, they can be considered constant for a specific operation during a limited time of use. The atmospheric pressure, water temperature and Lift can be grouped together and considered as z.

Where:

$z=P_{atm}\pm P_{vap(\Delta 60° F.)}$−Lift (Units in ft-hd)

For draft operation NPSHa reduces to:

NPSHa=z−Loss$_{hose}$ (Units in ft-hd)

Typical fire hose & strainer loss equations take the form:

Loss$_{hose}$=$a_h$*gpm$^2$ (Units in ft-hd)

Where:
$a_h$=coefficient constant per hose size and length, note this coefficient is difference for every hose diameter and length.
gpm=flow in U.S. gallons per minute If z is a constant per a specific operating incident then the change in NPSHa is strictly a function of the increased flow. And if Loss$_{hose}$=$a_h$*gpm$^2$ then using the change in loss (increase) with increased flow one can calculate the coefficient $a_h$.

Determining $a_h$:

NPSHa$_1$=z−$a_h$*gpm$_1^2$     Operating Point 1:

NPSHa$_2$=z−$a_h$*gpm$_2^2$     Operating Point 2:

To find $a_h$ is the change in NPSHa pressure therefore:

ΔNPSHa=NPSHa$_2$−NPSHa$_1$

Combining two equations together:

NPSHa$_2$−NPSHa$_1$=z−$a_h$*gpm$_2^2$−z+$a_h$*gpm$_1^2$

Reduces to:

NPSHa$_2$−NPSHa$_1$=$a_k$*(−gpm$_2^2$+gpm$_1^2$)

Solving for $a_h$:

$$\frac{(NPSHa_2 - NPSHa_1)}{(gpm_1^2 - gpm_2^2)} = a_h$$

If required z can be determined by solving:

NPSHa$_2$+$a_h$*gpm$_2^2$=z

Now consider the case of Hydrant or positive pressure operation.

$$NPSHa = P_{atm} \pm P_{vap(\Delta 60° F.)} - \text{Lift} + P_{hydrant} - \text{Loss}_{hose}$$
(Units in ft-hd)

Figure 5:
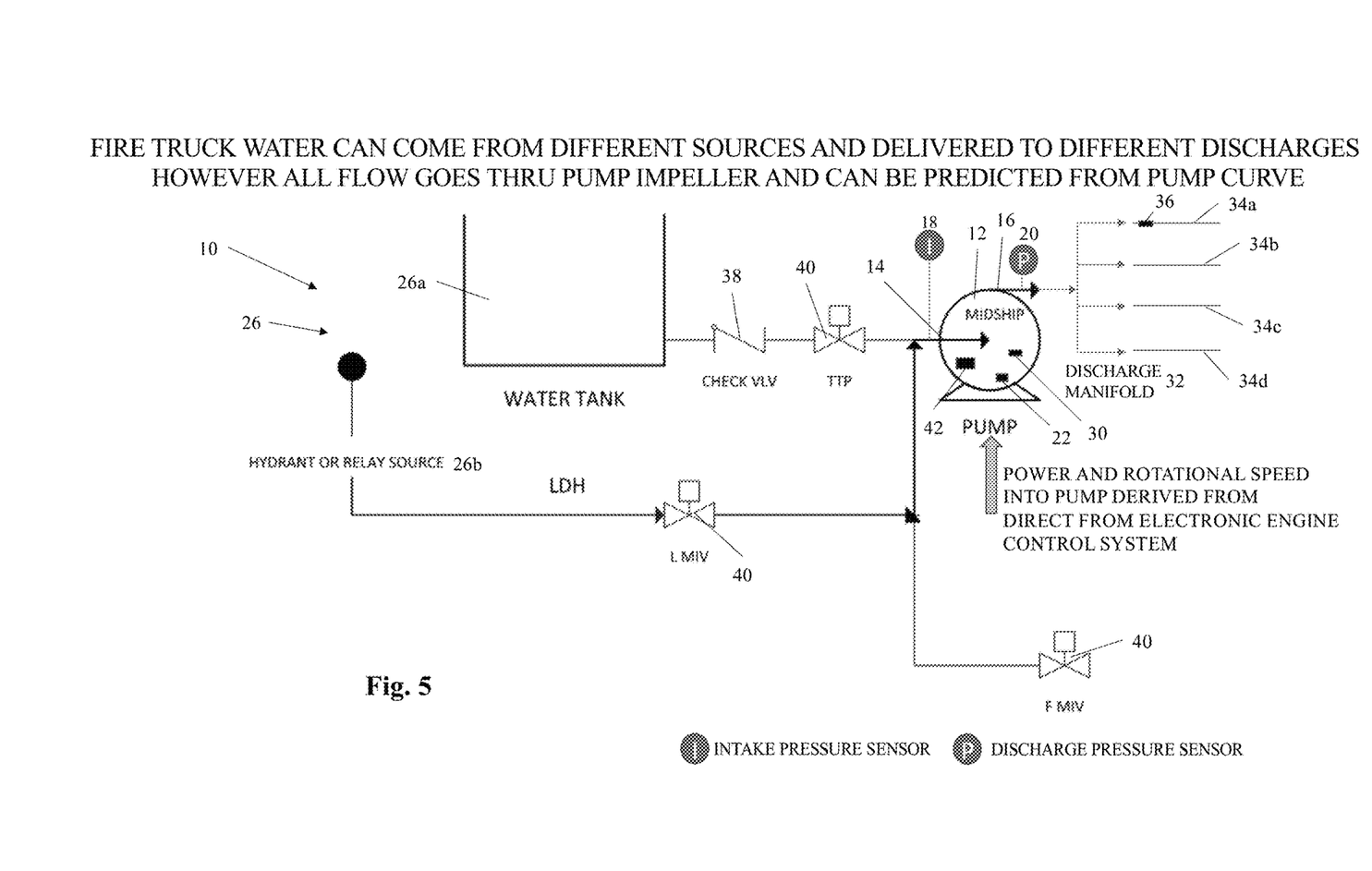
FIG. 5 is a schematic diagram for a fire truck pump flow prediction system in accordance with a preferred embodiment of the present invention.

In the preferred embodiments, the inlet pipe 14 is connected to a fire suppressant reservoir 26. The fire suppressant reservoir 26 is preferably configured to provide fire suppressant, preferably water, to the pump 12. The fire suppressant reservoir 26 may be comprised of nearly any component or source that is able to provide fire suppressant in a sufficient volume to the inlet pipe 14 and the pump 12, such as a water tank 26a, a hydrant or relay source 26b or any source that is able to supply a sufficient volume of fire suppressant to the inlet pipe 14 and pump 12, withstand the normal operating conditions of the fire suppressant reservoir 26 and perform the preferred functions of the fire suppressant reservoir 26, as described herein. When the hydrant or relay source 26b is the source of positive pressure to the inlet pipe 14 and the pump 12, the hydrant or relay source 26b will have its own performance curve or hydrant curve. Whereas flow increases the pressure will likely drop. This hydrant curve will most likely not be readily available or apparent. This will cause some unknown. However, for this application, we will assume the increase in losses will have a function similar to the hose loss equation and the hose friction loss will be considered just an extension of the hydrant system. Therefore:

$$P_{hydrant} = a_h * gpm^2 \text{ (Units in ft-hd)}$$

We will use the same form of z. So, for hydrant (positive pressure) operation NPSHa will be:

$$NPSHa = z + P_{hydrant} \text{ (Units in ft-hd)}$$

As the flow increases the hydrant pressure will decrease and therefore the same method to solve for $a_h$ will be the same.

$$\frac{(NPSHa_2 - NPSHa_1)}{(gpm_1^2 - gpm_2^2)} = a_h$$

Final Notes:

The calculations are preferably solved with six inputs; Atmospheric Pressure ($P_{atm}$), Water Temperature for vapor pressure ($P_{vap}$), Flow Point #1, Eye Pressure #1 (@ Flow point #1), Flow Point #2 and Eye Pressure #2 (@ Flow Point #2). Note that Eye Pressure #1 & #2 would be $NPSHa_1$ and $NPSHa_2$ in the above equations.

The coefficients $a_0$, $a_1$ and $a_2$ will most likely be different when max vac values are taken near the impeller eye.

Manual Sample Test of Program

Example Inputs (knowns):

| Discharge Pressure: | 258 psi | Range: 0 to 373 |
| Suction Pressure: | 0 psi | Range: −15 to 200 |
| Impeller RPM: | 3800 RPM | Range: 2400 to 4600 |
| Engine Power: | 250 hp | Range: 50 to 400 |

Solve for Intermediates:

| Net Discharge Pressure: | 258 psi | |
| Possible Flow #1= | 220 GPM* | Must be >= 0.0 |
| Possible Flow #2= | 620 GPM* | Must be >= 0.0 |
| Calculated hp #1= | 164 hp | |
| Calculated hp #2= | 201 hp | |

*Note: flows are rounded up to the next 10 GPM
Solve for Output:
FLOW=620 GPM

Figure 4:
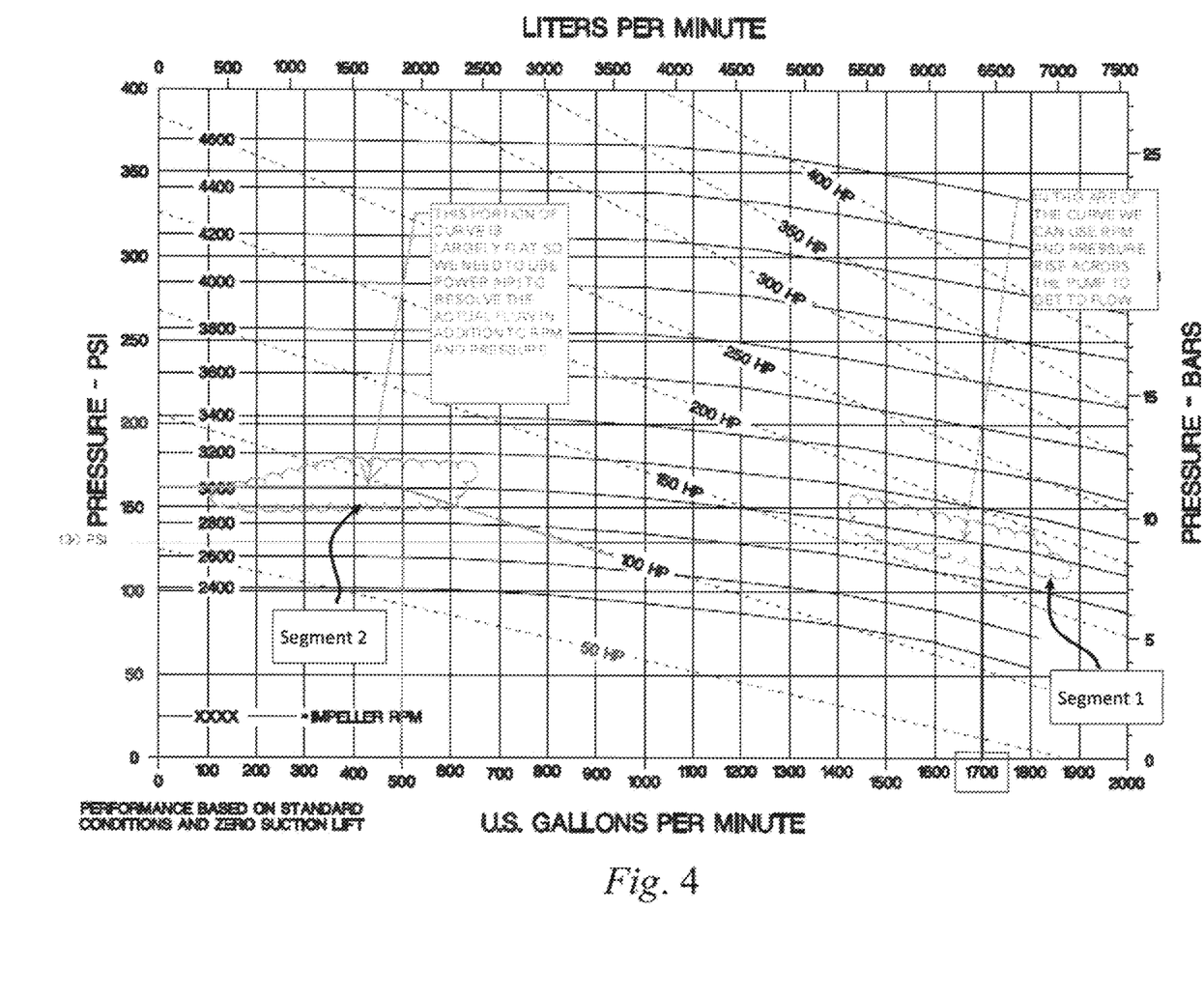
FIG. 4 is a pressure v flow curve chart for a standard fire truck pump for a fire truck pump flow prediction system in accordance with a preferred embodiment of the present invention.

This spreadsheet is a sample of a program to determine the flow through the pump 12, which may be comprised of nearly any one of a typical midship fire truck pump 12 in the preferred embodiments. The inputs above are manually entered and the values entered must be realistic to curve chart for a standard fire truck pump (FIG. 4). The flow calculation in the preferred embodiment of the flow through the pump 12 is preferably calculated by the central processor 24, which receives the intake pressure from the intake pressure sensor 18, the discharge pressure from the discharge pressure sensor 20 and the rotational speed of the pump 12 from the rotational sensor 22. The pump 12 is preferably driven by a motor 28 and a power sensor 30 is associated with the pump 12 of the preferred embodiments. The power sensor 30 is preferably configured to detect a power drawn by the pump 12 during operation, preferably during a fire suppression event. The central processor 24 is configured to receive the power drawn by the pump 12 during operation to determine the flow through the pump 12. The rotational speed may be sensed, collected and transmitted by an engine electronic control unit (ECU) 44 that is in communication with the central processor 24 and includes the rotational sensor 22. The engine ECU 44 is preferably configured to transmit data related to torque and/or power to the central processor 24 to use for prediction of the flow of fire suppressant through the pump 12. The ECU 44 is, accordingly, able to transmit both power or torque of the pump 12 or other data regarding the pump 12 that is related to the power and/or torque, such as duty cycle, which may be utilized to derive power drawn by the pump 12 during operation for calculation of the flow through the pump 12 during operation. The torque data may be collected from the motor 28 and power may be calculated utilizing the rotational speed of the pump 12 from the rotational sensor 22. The rotational speed data may be collected from the motor 28 or from the speed of the impeller of the pump 12 without significantly impacting the design and operation of the preferred system 10.

Intermediate Equations are as follows:

Net Discharge Pressure=Actual Discharge Pressure minus Actual Suction Pressure.

The flow rate in gallons per minute (GPM) and net discharge pressure in pounds per square inch (psi) at each revolution per minute (RPM) line or curve based on data from (FIG. 4) can be defined by a $2^{nd}$ degree polynomial as follows:

Net Discharge Pressure=$(a)(GPM^2)+(b)(GPM)+c$

The coefficients a, b & c in the above equation are polynomials that define how RPM varies from two thousand four hundred to four thousand six hundred revolutions per minute (2400-4600 RPM), again based on data from FIG. 4.

Solving the above equation for flow in gallons per minute (GPM) results in a quadratic equation as follows, (Note: flows are rounded up to the next 10 GPM):

Possible Flow #1=$(-b+(b^2-4*a*(c-\text{Net Discharge Pressure}))^5)/(2*a)$

Possible Flow #2=$(-b-(b^2-4*a*(c-\text{Net Discharge Pressure}))^5)/(2*a)$

Possible Flows are determined by solving above quadratic equations where coefficients determined by curve fitting Example: a=(2.70338e−10)(RPM)−2.21475e−5
b=(0.96881e−6)(RPM)+0.00918464
c=(0.4438e−5)(RPM$^2$)+(0.0207852)(RPM)−32.126

Also, the flow rate in gallons per minute (GPM) and net discharge pressure in pounds per square inch (psi) at each horsepower line or curve also based on data from characteristics of the pump 12 and the characteristic curve can be defined by a linear equation as follows:

$$\text{Net Discharge Pressure} = x + y * \text{GPM}$$

The coefficients x & y in the above equation are linear equations that define how horsepower varies from fifty to four hundred horsepower (50-400 hp), again based on data from the characteristics of the pump 12 and pump characteristics curve.

Example $x = 64.023857 + (1.254391)(hp)$
$y = -0.0505107 + (-0.000264077)(hp)$

Solving the above equation for horsepower (hp) results in the following equation:

$$\text{Calculated hp \#1} = \frac{(\text{Net Discharge Pressure} - 74.023857 - (-0.0565107 * \text{Possible Flow \#1}))}{(1.254391 + (-0.000264077 * \text{Possible Flow \#1}))}$$

$$\text{Calculated hp \#2} = \frac{(\text{Net Discharge Pressure} - 74.023857 - (-0.0565107 * \text{Possible Flow \#2}))}{(1.254391 + (-0.000264077 * \text{Possible Flow \#2}))}$$

The possible flow from the two possible flow equations can result in either a positive, negative or zero value. Any value that is negative according to this program will be considered as zero. Calculated horsepower compared to actual engine horsepower from the power sensor 30 will be used to determine which of the two possible flows is most likely to be the actual flow. The logic being that the engine horsepower, which is preferably collected from the power sensor 30, should be pump horsepower plus power being used to drive engine accessories and therefore engine power must be greater than horsepower shown on curve.

Typical of current centrifugal impeller pumps, such as the preferred pump 12, the head-capacity curve is very shallow and actually drops at shut-off. Within this region of "instability" it is difficult to predict actual pressure versus flow (thus the quadratic). One could have two different possible flows for the same pressure. Also, centrifugal pumps are not positive displacement pumps, meaning the pump can be run with discharge closed and still record a pressure and rotations per minute (RPM), but there would be no flow. So, an additional variable of horsepower (hp) is preferred to qualify the flow, i.e. no flow, low flow or high flow.

Parasitic load represented in horsepower (hp) is consumed by such things as the fan, AC, alternator, air compressor will affect HP readings so an additional calibration coefficient is preferably needed when the program is calibrated after the pump 12 is installed in the truck.

The power can be derived by the fuel rate reported by the engine or motor 28 or some engines deliver a percentage torque value that can be multiplied by the engine power to come up with net horsepower delivered to the pump 12.

Augmented Pump Flow Prediction

The family of pump performance curves (See FIG. 4) showing the relationship between flow and pressure for various impeller speeds has a negative slope for high flow rates (see, segment 1) and a substantially zero slope for low flow rates (see, segment 2). A preferred method for predicting flow is to use the foregoing equations for predicting the flow rate when the pump flow rate is expected to fall within segment 1 (i.e., when the flow is a high flow rate). When the pump flow rate is expected to fall within segment 2 (i.e., when the flow is a low flow rate), in addition to speed in rotations per minute (RPM) and pressure rise across the pump, the power requirement of the pump is preferably taken into consideration.

Although the foregoing equations could be modified to include power as a variable, preferably the relationship between flow and power may be predetermined empirically and made available in the pump control electronics as a look-up table.

In the preferred embodiments, the pump 12 is comprised of a centrifugal pump, but is not so limited and may be comprised of nearly any type or variety of pump that is able to perform the functions of the preferred pump 12, withstand the normal operating conditions of the pump 12 and may be installed into the fire truck as is described herein and generally understood by one having ordinary skill in the art based on a review of the present disclosure. In the preferred embodiments, the fire suppressant is water and is preferably delivered to the inlet pipe 14 by the fire suppressant reservoir 26, which may be comprised of the water tank 26a, the hydrant or relay source 26b or nearly any other reservoir that is able to supply the fire suppressant to the pump 12. The fire suppressant is not limited to water and may be comprised of nearly any suppressant that may be utilized to distinguish a fire, such as a foams, powders, water solutions and related fire suppressants, as would be apparent to one having ordinary skill in the art based on a review of the present disclosure.

In the preferred embodiment, the rotational sensor 22 may be comprised of an optical sensor, a magnetic sensor or nearly any other rotational sensor that is able to detect the rotational speed of the pump 12 during operation, withstand the normal operating conditions of the rotational sensor 22, perform the preferred functions of the rotational sensor 22 and may be installed into the first truck for communication with the central processor 24 as is described herein.

In the preferred embodiments, the fire truck flow prediction system 10 also includes a discharge manifold 32 connected to the discharge pipe 16, downstream from the pump 12 and discharge pipe 16. The discharge manifold 32 preferably receives the fire suppressant from the discharge pipe 16 and feeds the first suppressant into outlet pipes, which may include a first outlet pipe 34a, a second outlet pipe 34b, a third outlet pipe 34c and a fourth outlet pipe 34d. In the preferred embodiments, a flowmeter 36 is connected to the first outlet pipe 34a to measure or collect data regarding the flow through the first outlet pipe 34a. The first outlet pipe 34a of the preferred embodiments is configured for the discharge of foam fire suppressant and may be adapted for mixing or combination of water and materials to generate the foam fire suppressant. The second, third and fourth outlet pipes 34b, 34c, 34d may also be configured for foam fire suppressant discharge or may be designed and configured for discharge of nearly any type and variety of fire suppressant, without significantly impacting the operation and configuration of the preferred embodiments. In addition, the first outlet pipe 34a is not limited to being adapted for discharge of foam fire suppressant and may be configured for discharge of nearly any variety of first suppressant, such as water. In the preferred embodiments, the second, third and fourth outlet pipes 34b, 34c, 34d are designed and configured for discharge of water for fire suppression.

In the preferred embodiments, the fire truck flow prediction system 10 also includes a power sensor 30 associated with the pump 12. The power sensor 30 is configured to detect a power drawn by the pump 12 during operation. The central processor 24 is configured to receive the power during operation to determine the flow through the pump 12.

The fire truck pump flow prediction system 10 of the preferred embodiments further includes a check valve 38 connected to the inlet pipe 14 to limit flow of the fire suppressant, preferably water, into the inlet pipe 14 and to the pump 12. The system 10 is not limited to including the check valve 38 or to including only a single check valve 38 and may include multiple check valves 38 located at various locations in the system 10. In addition, the preferred system 10 further includes additional or other valves 40 that are mounted to the pipes 14, 16, 34a, 34b, 34c, 34d to limit flow of the first suppressant through the pipes 14, 16, 34a, 34b, 34c, 34d during operation, as would be apparent to one having ordinary skill in the art based on a review of the present application. In one of the preferred embodiments, the fire suppressant reservoir 26 is connected to the inlet pipe 14 and the check valve 38 is positioned between the pump 12 and the fire suppressant reservoir 26, preferably the water tank 26a.

In the preferred embodiments, the power sensor 30 is connected to the motor 28 and is configured to detect a power drawn by the motor 38 during operation. The central processor 24 is configured to receive the power during operation. The central processor 24 is also configured to calculate the flow through the pump 12 using the power, the inlet pressure from the intake pressure sensor 28, the discharge pressure from the discharge pressure sensor 20 and the rotational speed from the rotational sensor 22. Utilization of the preferred sensors 18, 20, 22, 30 and relatively constant properties of the fire suppressant facilitates calculation, generally dynamic calculation, of the flow through the pump 12, which provides the user with the amount of suppressant that is utilized during a particular fire event and at a particular time from an extinguishing hose and nozzle to improve safety for users. The relatively small sensors that do not command large space or installation complication are preferred to known methods and estimates for determining flow from the fire truck during operation. In the preferred embodiments, the flow is preferably determined based on the inlet pressure, the discharge pressure, the rotational speed and the power without using a flowmeter, although the system 10 may employ flowmeters in combination with the data collected as a fail-safe, double-check or confirmation of actual flows through the pump 12 or out of the outlet pipes 34a, 34b, 34c, 34d. The central processor 24 of the preferred embodiment may also determine flow through the pump 12 utilizing a torque collected by a torque meter 42 connected to the pump 12 that is combined with the additional data collected by the central processor 24. In the preferred embodiments, the torque meter 42 is comprised of a rotary torque meter, but is not so limited and may be comprised of nearly any torque meter 42 that is able to perform the preferred functions of the torque meter 42, withstand the normal operating conditions of the torque meter 42 and adapt for installation into the system 10 of the preferred embodiments. Torque may also be determined from engine data available across an engine data link, such as the SAE J1939 network that provides engine data that is analogous to torque from which torque can be calculated.

In the preferred embodiments, the central processor 24 is also configured to compare the flow to a pump capacity of the pump 12 under current conditions as defined by the installed sensors. The central processor 24 is subsequently configured to determine a reserve flow capacity of the pump 12, based on the comparison of the flow to the pump capacity of the pump 12. The reserve flow capacity and the flow are preferably displayed on a display, gauge or other indication system that is able to communicate the flow, reserve flow capacity, and other collected and calculated data from the central processor such that the user is able to track and make decisions about the event dynamically during operation.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A fire truck pump flow prediction system for predicting flow of fire suppressant through a fire truck, the fire truck pump flow prediction system comprising:
   a pump connected to the fire truck and powered by an engine of the fire truck, the engine having an engine electronic control unit;
   an inlet pipe connected to the pump configured to provide the fire suppressant to the pump;
   a discharge pipe connected to the pump configured to carry the fire suppressant away from the pump;
   an intake pressure sensor connected to the inlet pipe, the intake pressure sensor configured to detect fire suppressant inlet pressure flowing into the pump;
   a discharge pressure sensor connected to the discharge pipe, the discharge pressure sensor configured to detect fire suppressant discharge pressure flowing out of the pump;
   a rotational sensor, the rotational sensor configured to detect a rotational speed of the pump during operation;
   a power sensor, the power sensor configured to detect a power drawn by the pump during operation, the power sensor comprising an engine electronic control unit of the engine, the engine electronic control unit configured to transmit data, the data including one of a torque and a power used by the pump; and
   a central processor connected to the intake pressure sensor, the discharge pressure sensor, the rotational sensor and the engine electronic control unit, the central processor configured to calculate a flow rate of the fire suppressant through an impeller of the pump and into the discharge pipe based on the inlet pressure, the discharge pressure, the rotational speed and one of the torque and the power, such flow rate being calculated without using a flowmeter by a method comprising the following steps:
   obtaining input data comprising the inlet pressure, the discharge pressure, the rotational speed and at least one of the torque or the power from at least the intake pressure sensor, the discharge pressure sensor, the rotational sensor and the power sensor;
   calculating the following intermediates based on the input data:
   (a) where the input data comprises the torque and does not comprise the power, power calculated as the product of torque and rotational speed;
   (b) a net discharge pressure calculated as the difference between the discharge pressure and the inlet pressure;
   (c) a first possible flow value (Max Flow #1) computed as $$\text{Max Flow \#1(gpm)} = \frac{-(-.000526364) + \sqrt{(-0.000526364)^2 - 4(3.51404e - 006 + a_h)(5.453943627 - z)}}{2(3.51404e - 006 + a_h)}$$

(d) a second possible flow value (Max Flow #2) computed as $$\text{Max Flow \#2(gpm)} = \frac{-(-.000526364) - \sqrt{(-0.000526364)^2 - 4(3.51404e-006 + a_h)(5.453943627 - z)}}{2(3.51404e-006 + a_h)}$$

selecting either Max Flow #1 or Max Flow #2 as the calculated flow rate by a method comprising:
(e) where one of Max Flow #1 and Max Flow #2 is positive and the other is negative, selecting the positive as the calculated flow rate;
(f) where Max Flow #1 and Max Flow #2 are both positive, selecting one of Max Flow #1 and Max Flow #2 as the calculated flow rate by the following steps:
  determining a first calculated pump horsepower for Max Flow #1 and a second calculated pump horsepower for Max Flow #2 based on a known relationship between the expected flow rate and the power for the fire trunk flow prediction system based on the input data;
  if one of the first and second calculated pump horsepower does not exceed the power and the other of the first and second calculated pump horsepower exceeds the power, selecting the one of Max Flow #1 and Max Flow #2 corresponding to the one of the first and second calculated pump horsepower not exceeding the power;
  and otherwise, if neither of the first and second calculated pump horsepower exceeds the power, or if both the first and second calculated pump horsepower exceed the power, then selecting as the calculated flow rate the one of Max Flow #1 and Max Flow #2 wherein the absolute value of the difference between the corresponding first calculated pump horsepower or second calculated pump horsepower with respect to the power is minimized.

2. The fire truck pump flow prediction system of claim 1, wherein the pump is a centrifugal pump.

3. The fire truck pump flow prediction system of claim 1, wherein the fire suppressant is water.

4. The fire truck pump flow prediction system of claim 1, wherein the rotational sensor is comprised of one of an optical sensor and a magnetic sensor.

5. The fire truck pump flow prediction system of claim 1, further comprising:
a discharge manifold connected to the discharge pipe, the discharge manifold receiving the fire suppressant from the discharge pipe.

6. The fire truck pump flow prediction system of claim 1, wherein the rotational speed is transmitted from the engine electronic control unit of the fire truck.

7. The fire truck pump flow prediction system of claim 1, further comprising:
a fire suppressant reservoir connected to the inlet pipe, the fire suppressant reservoir configured to provide fire suppressant to the pump.

8. The fire truck pump flow prediction system of claim 7, wherein the fire suppressant reservoir is comprised of a water tank.

9. The fire truck pump flow prediction system of claim 7, wherein the fire suppressant reservoir is comprised of one of a hydrant and a relay source.

10. The fire truck pump flow prediction system of claim 1, further comprising:
a check valve connected to the inlet pipe; and
a fire suppressant reservoir connected to the inlet pipe, the check valve positioned between the pump and the fire suppressant reservoir.

11. The fire truck pump flow prediction system of claim 1, further comprising:
a discharge manifold connected to the discharge pipe;
a first outlet pipe connected to the discharge manifold;
the first outlet pipe configured for discharge of a foam fire suppressant.

12. The fire truck pump flow prediction system of claim 11, further comprising:
a second outlet pipe connected to the discharge manifold;
a third outlet pipe connected to the discharge manifold; and
a fourth outlet pipe connected to the discharge manifold, the second, third and fourth outlet pipes configured for discharge of water as the fire suppressant.

13. The fire truck pump flow prediction system of claim 1, wherein the flow rate is compared to a pump capacity of the pump by the central processor, the central processor configured to determine a reserve flow capacity of the pump.

14. The fire truck pump flow prediction system of claim 1, wherein the central processor is comprised of a series of processors configured for distributed signal processing.

15. The fire truck pump flow prediction system of claim 1, wherein at least one of the intermediates, Max Flow #1, or Max Flow #2 is calculated by use of a lookup table.

16. A fire truck pump flow prediction system for predicting flow of fire suppressant through a fire truck, the fire truck pump flow prediction system comprising:
a pump connected to the fire truck;
a motor powering the pump;
an inlet pipe connected to the pump configured to provide the fire suppressant to the pump;
a discharge pipe connected to the pump configured to carry the fire suppressant away from the pump;
an intake pressure sensor connected to the inlet pipe, the intake pressure sensor configured to detect fire suppressant inlet pressure flowing into the pump;
a discharge pressure sensor connected to the discharge pipe, the discharge pressure sensor configured to detect fire suppressant discharge pressure flowing out of the pump;
a rotational sensor, the rotational sensor configured to detect a rotational speed of the pump during operation;
a power sensor configured to detect at least one of a torque or a power drawn by the pump during operation, and
a central processor connected to the intake pressure sensor, the discharge pressure sensor, the rotational sensor and the power sensor, the central processor configured to calculate a flow rate of the fire suppressant through an impeller of the pump and into the discharge pipe based on the inlet pressure, the discharge pressure, the rotational speed and the power, such flow rate being calculated without using a flowmeter by a method comprising the following steps:
obtaining input data comprising the inlet pressure, the discharge pressure, the rotational speed and at least one of the torque or the power from at least the intake pressure sensor, the discharge pressure sensor, the rotational sensor and the power sensor;

calculating the following intermediates based on the input data:
- (a) where the input data comprises the torque and does not comprise the power, power calculated as the product of torque and rotational speed;
- (b) a net discharge pressure calculated as the difference between the discharge pressure and the inlet pressure;
- (c) a first possible flow value (Max Flow #1) computed as Max Flow #1(gpm) =

$$\frac{-(-.000526364) + \sqrt{(-0.000526364)^2 - 4(3.51404e - 006 + a_h)(5.453943627 - z)}}{2(3.51404e - 006 + a_h)}$$

- (d) a second possible flow value (Max Flow #2) computed as

Max Flow #2(gpm) =

$$\frac{-(-.000526364) - \sqrt{(-0.000526364)^2 - 4(3.51404e - 006 + a_h)(5.453943627 - z)}}{2(3.51404e - 006 + a_h)}$$

selecting either Max Flow #1 or Max Flow #2 as the calculated flow rate by a method comprising:
- (e) where one of Max Flow #1 and Max Flow #2 is positive and the other is negative, selecting the positive as the calculated flow rate;
- (f) where Max Flow #1 and Max Flow #2 are both positive, selecting one of Max Flow #1 and Max Flow #2 as the calculated flow rate by the following steps:

determining a first calculated pump horsepower for Max Flow #1 and a second calculated pump horsepower for Max Flow #2 based on a known relationship between the expected flow rate and the power for the fire trunk flow prediction system based on the input data;

if one of the first and second calculated pump horsepower does not exceed the power and the other of the first and second calculated pump horsepower exceeds the power, selecting the one of Max Flow #1 and Max Flow #2 corresponding to the one of the first and second calculated pump horsepower not exceeding the power;

and otherwise, if neither of the first and second calculated pump horsepower exceeds the power, or if both the first and second calculated pump horsepower exceed the power, then selecting as the calculated flow rate the one of Max Flow #1 and Max Flow #2 wherein the absolute value of the difference between the corresponding first calculated pump horsepower or second calculated pump horsepower with respect to the power is minimized.

17. The fire truck pump flow prediction system of claim 16, further comprising:
a discharge manifold connected to the discharge pipe;
a first outlet pipe connected to the discharge manifold, the first outlet pipe configured for discharge of a foam fire suppressant.

18. The fire truck pump flow prediction system of claim 16, wherein at least one of the intermediates, Max Flow #1, or Max Flow #2 is calculated by use of a lookup table.

19. The fire truck pump flow prediction system of claim 16, further comprising:
a check valve connected to the inlet pipe; and
a fire suppressant reservoir connected to the inlet pipe, the check valve positioned between the pump and the fire suppressant reservoir.

* * * * *